Nov. 3, 1970    W. G. ANDERS    3,537,768

EJECTOR MECHANISM FOR POWER FILE

Filed Nov. 19, 1968    4 Sheets-Sheet 1

INVENTOR.
Walter G. Anders
BY
Frease & Bishop
ATTORNEYS

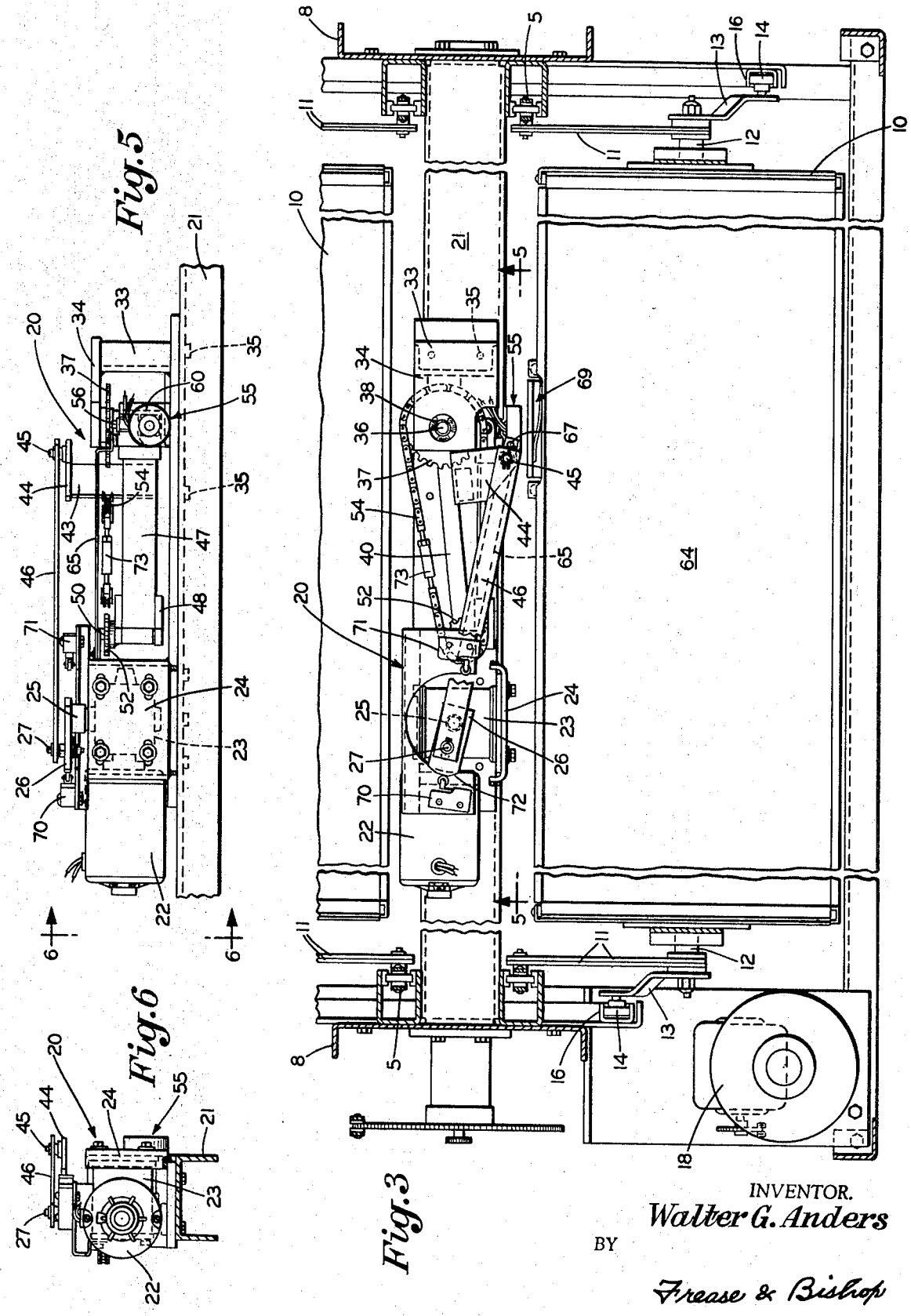

Nov. 3, 1970

W. G. ANDERS 3,537,768

EJECTOR MECHANISM FOR POWER FILE

Filed Nov. 19, 1968

INVENTOR.
Walter G. Anders
BY
Frease & Bishop
ATTORNEYS

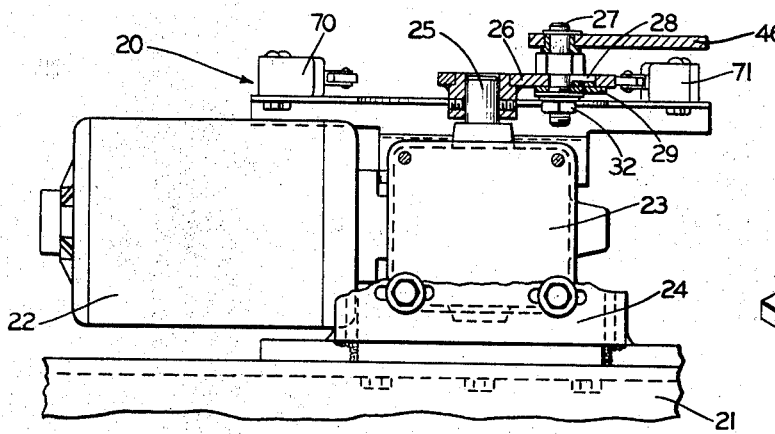

United States Patent Office 3,537,768
Patented Nov. 3, 1970

3,537,768
EJECTOR MECHANISM FOR POWER FILE
Walter G. Anders, Canton, Ohio, assignor to Diebold, Incorporated, Canton, Ohio, a corporation of Ohio
Filed Nov. 19, 1968, Ser. No. 777,101
Int. Cl. A47b 77/08, 81/00
U.S. Cl. 312—223
7 Claims

ABSTRACT OF THE DISCLOSURE

A power operated drawer moving ejector mechanism to move a drawer of a pan-drawer assembly between extended and retracted positions when the assembly is located at the work station of a power filing appliance wherein a number of pan-drawer assemblies travel on an endless conveyor in a continuous orbit. The ejector mechanism is located in a limited space between the flights of travel of the conveyor and imparts positive straight line movement to a fixedly oriented actuator head releasably engageable with the drawer to impart movement from a power operated scissors type lever system through the head to the drawer.

CROSS-REFERENCE TO RELATED PATENTS AND APPLICATION

The improved ejector mechanism is an improvement upon the structures of Pats. Nos. 3,297,378 and 3,298,766, and my copending application Ser. No. 774,697, filed Nov. 12, 1968.

BACKGROUND OF THE INVENTION

Field of the invention

The invention relates to a power file of the type in which a plurality of pans are mounted on an endless conveyor for movement in either direction in a continuous orbit of travel and any selected pan is delivered by power means to a work station where a drawer, which may be latched on a pan, is unlatched and moved between retracted and extended positions; and more particularly to a drawer moving ejector mechanism which may be located in a minimum amount of space between the flights of travel of the endless conveyor adjacent the work station to impart positive and direct straight line moving forces to a drawer to be moved which is located at the work station.

Description of the prior art

Ejector mechanisms have been provided for actuating the drawers of power files at a work station such as shown in Pats. Nos. 3,297,378 and 3,298,766. These prior mechanisms operate to impart the desired rate of movement to the drawer between retracted and extended positions. The actual moving forces, however, are imparted from the ejector mechanism to the drawer through a spring-like thrust unit which transmits forces around a corner from the thrust unit connection with the ejector mechanism motor drive to the point of engagement of the thrust unit head with the drawer to be moved. These prior structures satisfy the limited space and motion requirements for which they are designed, but because of including a spring, whose characteristics may change, as a part of the thrust unit, their operating characteristics may vary from device to device, and may change as a result of repeated use. Thus, the operation of such prior ejector mechanisms may not be uniform from file to file and as any file ages; and the spring inherently may flex to some degree and therefore does not inflexibly apply a positive force. The structure of my copending application avoids the problems encountered in using a spring-like thrust element, but involves a bevel gear drive for the scissors-type lever arm mechanism in positively driving both arms of the mechanism with a 2 to 1 mechanical advantage. It is desirable to avoid the use of a bevel gear drive, and to provide a positive stroke change adjustment and stabilized, floating movement for the actuator head.

SUMMARY OF THE INVENTION

Objectives of the invention include providing a power file ejector mechanism which eliminates the varying characteristics and springiness of a spring member for conveying and applying thrust from a drive located in a confined space between flights of the file conveyor mechanism to a drawer to be moved by such thrust; providing an ejector mechanism which imparts positive straight-line movement to an actuator thrust head which may be releasably connected to a drawer to be moved, from a drive mechanism located in a confined space extending generally at right angles to the direction of straight-line movement; providing an ejector mechanism with a scissors-type lever system driven by a crank and lever arm for transmitting power from the drive motor to the actuator head of the ejector mechanism for imparting straight-line movement to the head; providing a scissors-type lever system for an actuator thrust head moved in a straight line by the system with means for positively adjusting the length of stroke of the thrust head, with stabilizing means for maintaining orientation of the head at all times, and with a floating mount for the head so that the engaging surface of the actuator head can accommodate to warping or tilting of the surface of a file drawer engaged and moved by the head; and providing an ejector mechanism eliminating difficulties heretofore encountered, achieving the indicated objectives simply, effectively and inexpensively, and solving problems and satisfying needs existing in the art.

These objectives and advantages are obtained by the power operated ejector mechanism for moving a drawer of a power file, the general nature of which may be stated as including, in power-operated ejector construction for moving the drawers of a power file of the type in which a plurality of pans are mounted on an endless conveyor mechanism carried by support means for movement in either direction in a continuous orbit of travel having at least one flight of travel in a plane extending parallel with the orbital axes and any selected pan is delivered by conveyor drive power means to a predetermined work station location, and in which a drawer is supported on each pan as a pan-drawer assembly on suspension mechanism which permits the drawer to be moved between ejected and retracted positions through a file access opening provided in the file case at said work station location; a support member mounted on the support means adjacent the work station and between flights of orbital conveyor travel, and drawer ejector mechanism; the ejector mechanism including motor means mounted on the support member and having a drive shaft, and a scissors-type lever system mounted on the support member; said lever system including a first shaft having a vertical axis, a first lever arm pivotally mounted at one end on said first shaft axis, the other end of the first arm having a second pivot axis, a second lever arm, means pivotally mounting one end of the second arm on said second pivot axis, the other free end of said second arm having a third pivot axis, an actuator head pivotally mounted on the third pivot axis at the free end of said second arm, and the effective lever arm length of said first and second lever arms between the pivot axes at the ends thereof being the same; drive means including a crank and lever pivotally connected together and operatively connected between said motor drive shaft and said first arm for rotating said first arm about the first axis between ejected and retracted positions, a first sprocket mounted on said first shaft axis, a second sprocket mounted on said second pivot axis, and operative connections between said arms and sprockets for rotating the second arm about the second pivot axis as the first arm is rotated about the first shaft axis for moving the actuator head between ejected and retracted positions; said actuator head being moved in a straight line of travel perpendicular to a plane passing through the orbital axes as the actuator head moves between ejected and retracted positions; means for adjusting to a plurality of positive positions the pivotal connection between the crank and lever to adjust the length of stroke of the thrust head; the first and second sprockets being differently sized and chain connected to provide a mechanical advantage in driving the second sprocket; means for stabilizing the orientation of the engaging face of the actuator head to be generally perpendicular at all times to the line of head movement throughout such head movement; and flexible means supporting the head on its pivot mount so that the engaging face may accommodate flexing or twisting of a drawer surface engaged and moved by the head.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

FIG. 3 is a plan sectional view of the file taken on the line 3—3, FIG. 2, showing a pan at the work station with the drawer thereon in closed position and showing the general location of the improved ejector mechanism, certain of the parts being broken away;

FIG. 5 is a fragmentary side elevation of the ejector mechanism looking in the direction of the arrows 5—5, FIG. 3;

FIG. 6 is an end view of the parts shown in FIG. 5 looking in the direction of the arrows 6—6, FIG. 5;

FIG. 9 is an enlarged sectional view taken on the line 9—9, FIG. 4;

FIG. 10 is an enlarged fragmentary sectional view looking in the direction of the arrows 10—10, FIG. 4;

FIG. 11 is a sectional view looking in the direction of the arrows 11—11, FIG. 4;

FIG. 12 is an enlarged sectional view of the actuator head and floating mount therefor taken on the line 12—12, FIG. 4; and FIGS. 13 and 14 are perspective views of the adjusting components of the stroke adjustment for actuator head movement.

Similar numerals refer to similar parts throughout the drawings.

DESCRIPTION OF THE PREFERRED EMBODIMENT

Figure 1:
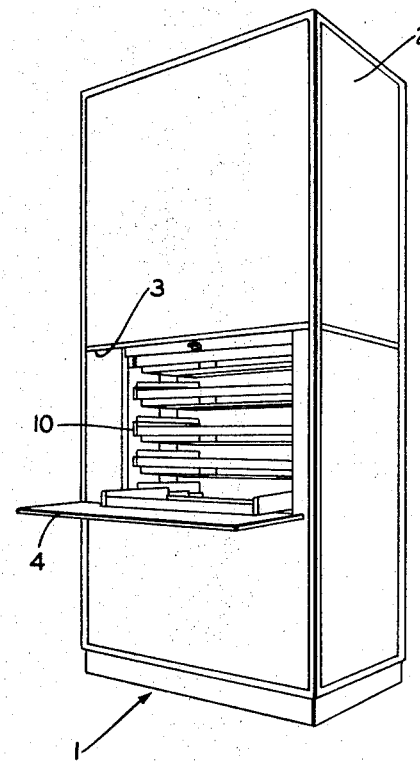
FIG. 1 is a perspective view of a power file equipped with the improved ejector mechanism.

The improved ejector or ejector-retractor mechanism for power files is illustrated and described in the drawings in connection with a power file of the general type shown in Pats. Nos. 3,166,366, 3,297,378 and 3,298,766.

The file is indicated generally at 1 and may include a housing or cabinet 2, the front wall of which may be provided with an opening 3 above a counter or work station 4. A pair of conveyor chains 5 trained over sprockets 6 and 7 mounted on upright support members 8 carried at 9 within housing 2 mount a series of pans 10 for movement in either direction in a continuous orbit of travel.

Each pan 10 is mounted at each end on a pair of arms 11 fixed to a chain 5, and the arms 11 pivotally support an end of a pan 10 at 12. A stabilizing arm 13 is fixed to each end of each pan 10 having a roller 14 at its other end. Rollers 14 engage and are guided in movement around the upper and lower ends of the path of conveyor travel by semicircular guide channels 15 and 16 to maintain pans 10 in a horizontal position throughout the upper and lower ends of the orbit of travel on conveyor 5 when traveling around sprockets 6 and 7. Horizontal positioning of pans 10 is maintained during travel in the vertical flights between sprockets 6 and 7 by engagement of a V-ear 17 at each end of one pan with the pivot shaft 12 of the pan next below.

Conveyor 5 is driven in a suitable manner from drive motor 18 (FIG. 3) which may be a reversing motor, operated preferably by selector switches and a rotary selector control switch, not shown, of a type such as disclosed in Pat. No. 3,198,894. The detailed construction and operation of the conveyor, housing, etc. previously described herein may be of the type shown in Pat. No. 3,199,658.

Power files such as shown in the patents referred to comprise a plurality of pans mounted on an endless conveyor for movement in either direction in a continuous orbit of travel. Any selected pan may be delivered by power operation of the conveyor to a location opposite the work station 4. A drawer on a suspension mechanism forming a part of any pan-drawer assembly delivered to the work station may be moved manually between extended position, such as shown in dot-dash lines at 19 in FIG. 2, and a retracted position located in the path of the orbit of travel, such as shown in the full-line position of pans 10 in FIG. 2. Also, any drawer on any pan-drawer assembly at any other location accessible at the access opening 3 of FIG. 2 may be moved manually between extended and retracted positions.

Alternately, a drawer of a pan-drawer assembly located at the work station 4 may be moved between extended and retracted positions by power mechanism and automatic controls of the general type shown in said Pats. Nos. 3,297,378 and 3,298,766. In accordance with the concepts of the invention, the improved drawer-moving or ejector-retractor mechanism, hereinafter sometimes termed ejector mechanism, for the power ejection and retraction movement of any drawer located at work station 4, is constructed and operated as described below.

Figure 2:
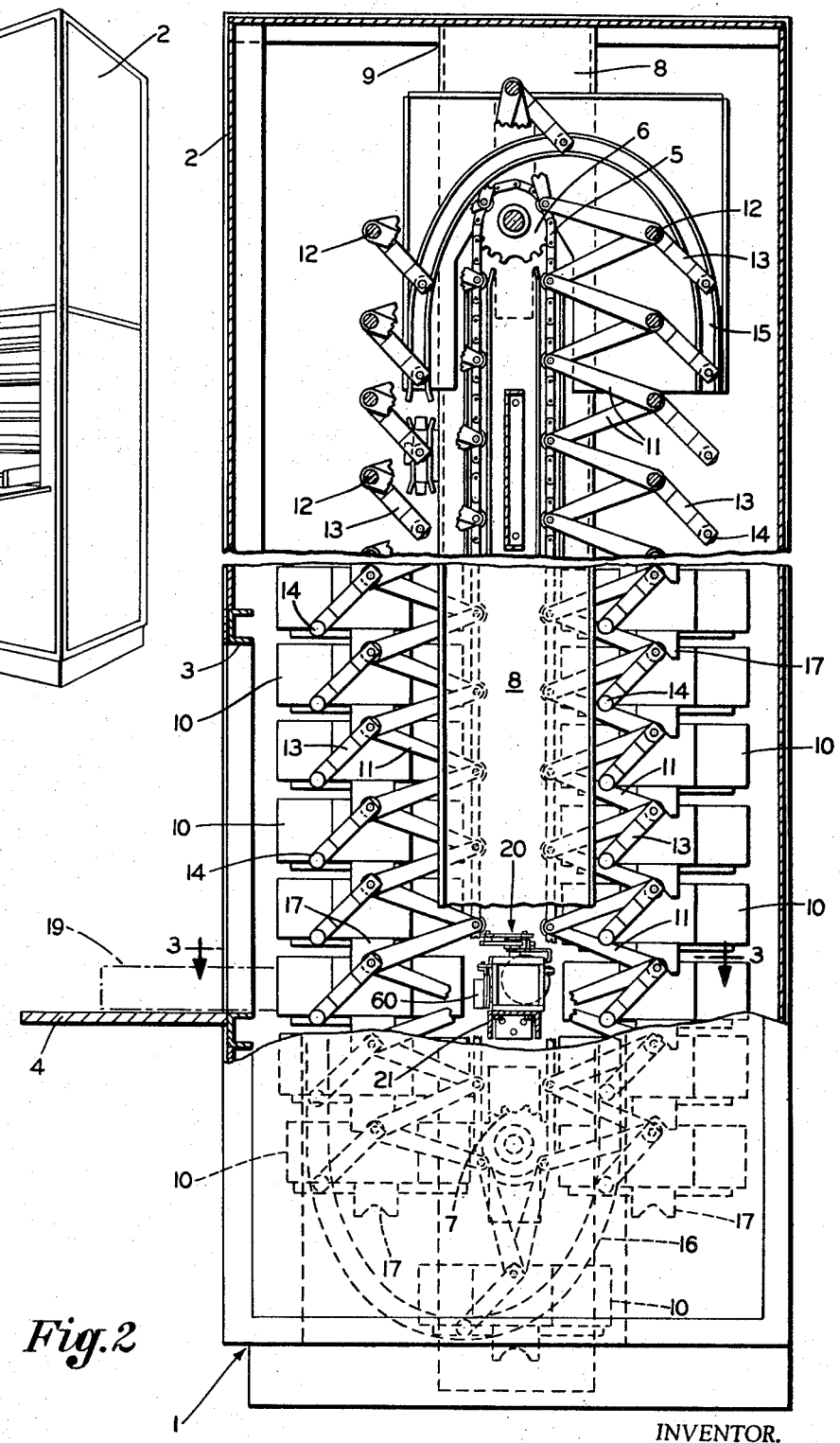
FIG. 2 is an enlarged side elevation with parts broken away and in vertical section at various locations looking from the right side of FIG. 1, showing the pans in full lines in one sectional portion, and showing a drawer in dot-dash lines ejected from one pan at a work station by the improved ejector mechanism.
Figure 8:
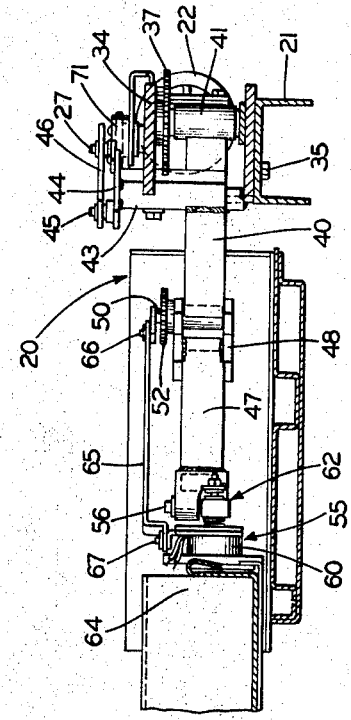
FIG. 8 is a sectional view looking in the direction of the arrows 8—8, FIG. 4.

The improved ejector mechanism generally indicated at 20 is located in the limited space available between the rear or right of the pans 10 in the flight of travel at the left of FIG. 2 and the front or left of the pans in the flight of travel at the right of FIG. 2. The mechanism 20 is mounted and supported on channel members 21 (FIGS. 3 and 4) extending between upright support members 8 at either end of power file 1 within cabinet 2.

Ejector mechanism 20 preferably includes a power operated motor 22, which may be reversing or non-reversing, mounted on a housing 23 carried by bracket 24 which is, in turn, bolted to channel member 21 (FIGS. 3, 5 and 6). Motor 22 through reduction gears in housing 23 drives shaft 25. Shaft 25 is fixed to crank 26 (FIG. 11) which has crank pin 27 mounted thereon adjustable in slot 28 formed in crank 26. A washer 29 having a pin 30 and an opening 31 is interposed between crank pin nut 32 and crank 26 (FIG. 11). Washer 29 is reversible so that its pin 30 may be engaged in either end of slot 28 of crank 26 while crank pin 27 extends through washer opening 31 and the end of slot 28 not occupied by washer pin 30. Thus, an adjustment is provided for the effective length of the crank arm of crank 26 from shaft 25 to crank pin 27 with either adjustment positively locating crank pin 27.

A bracket 33 having a top flange 34 is mounted by bolts 35 on channel member 21 spaced from motor mounting bracket 24. A pivot shaft 36 is journaled at its ends in bracket 33 and top flange 34 (FIG. 9).

A sprocket 37 is mounted on bracket flange 34 and welded thereto at 38. The sprocket hub has a bearing 39 in which the upper end of pivot shaft 36 is journaled.

Figure 4:
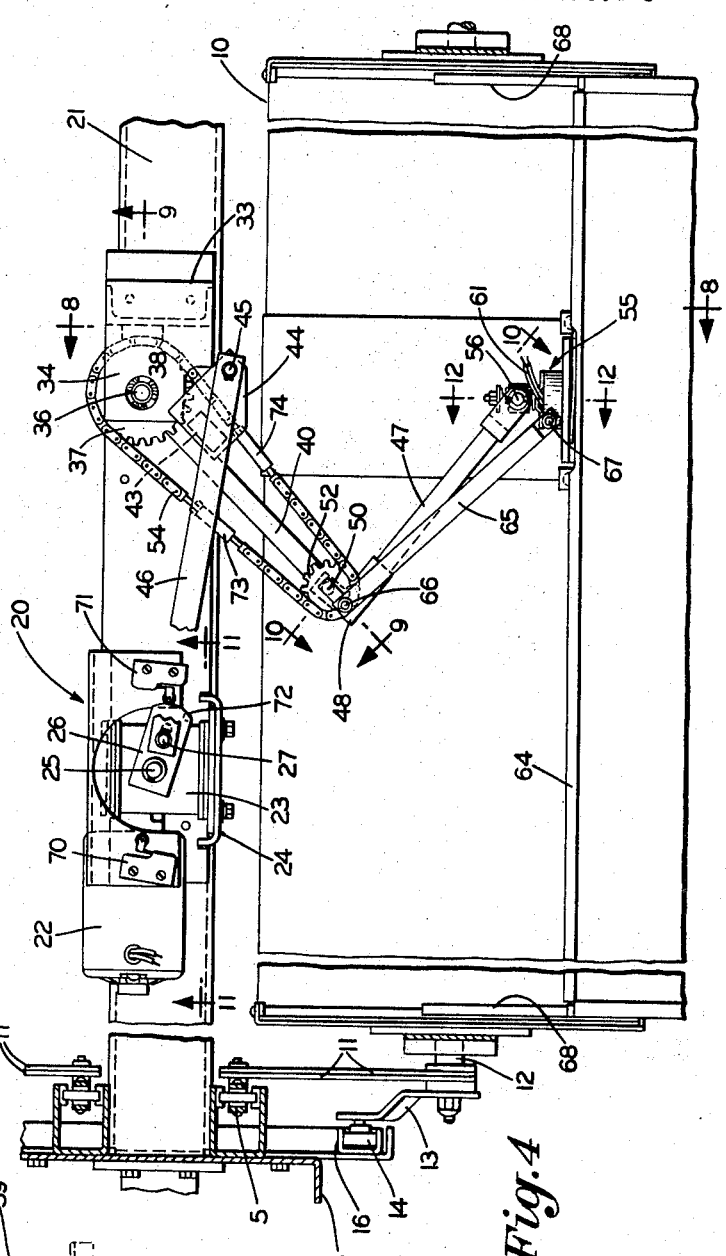
FIG. 4 is a view similar to a portion of FIG. 3, but showing a drawer and the ejector mechanism in ejected position.

A primary lever arm 40 has one end 41 thereof mounted on pivot shaft 36 and said lever arm end 41 preferably is fixed to pivot shaft 36 between the journals of the latter by a set screw 42. A post member 43 projects upwardly from lever arm 40 parallel with the axis of pivot shaft 36 (FIG. 9) adjacent said pivot shaft 36. A crank bracket 44 is mounted on the upper end of post member 43 and projects laterally thereof in a direction away from arm 40 (FIG. 4). Crank pin 45 projects upwardly from the outer end of crank bracket 44, parallel with and offset from the axes of pivot shaft 36, crank pin 27 and drive shaft 25.

A link 46 is pivotally connected at its ends to crank pin 45 and adjustable crank pin 27 whereby rotation or oscillation of crank pin 27 about the axis of drive shaft 25 oscillates primary lever arm 40 about pivot axis 36 between the retracted position of FIG. 3 and the extended position of FIG. 4.

Figure 7:
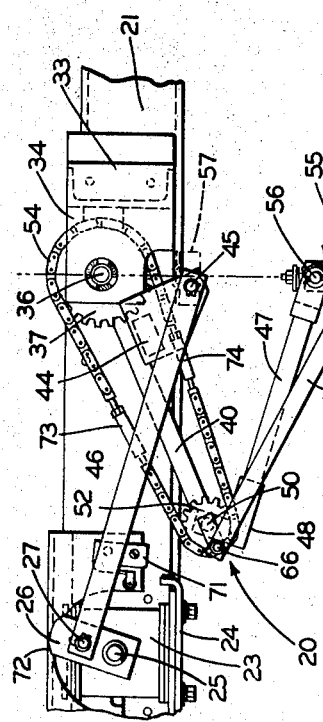
FIG. 7 is a fragmentary view showing the ejector mechanism in full lines at an intermediate stage of operation, illustrating the straight-line path of movement of the actuator head.

A secondary lever arm 47 has an L-shaped bifurcated end 48 journaled at 49 (FIG. 9) on pivot shaft 50 fixed by set screw 51 to the outer swinging end of primary lever arm 40. Thus, the axis of pivot shaft 50 on which secondary lever arm 47 pivots, is offset laterally from arm 47 at the bifurcated end of the latter (FIGS. 4 and 7).

A sprocket 52 having half the number of teeth that sprocket 37 has, is fixed to the bifurcated end 48 of secondary lever arm 47 as by welding at 53 (FIG. 9), and a chain drive 54 connects sprockets 37 and 52.

An actuator head generally indiciated at 55 is pivotally mounted on pivot shaft 56 on the outer free end of secondary arm 47. The length of primary lever arm 40 between pivot axes 36 and 50 equals the lever arm length of secondary lever arm 47 between pivot shafts 50 and 56.

When crank 26 is oscillated or rotated between the retracted position of FIG. 3 and the extended position of FIG. 4, link 46 oscillates primary lever arm 40 about pivot shaft 36 between the retracted and extended positions of FIGS. 3 and 4. Meanwhile, the chain connection 54 between stationary sprocket 37 and sprocket 52 fixed to secondary lever arm 47 rotates the bifurcated end 48 of secondary lever arm 47 about pivot axis 50 twice as fast as the end of primary lever arm 40 rotates about pivot axis 36.

The movement of lever arms 40 and 47 is a scissors-like movement, and since both lever arms have the same effective length, pivot pin 56 at the outer or free end of lever arm 47 moves from the retracted position of actuator head 55, indicated by dot-dash lines at 57 in FIG. 7, to the extended position, as indicated by dot-dash lines at 58, so that pivot pin 56, and, the actuator head 55, move in a straight line between retracted and extended positions, as indicated by the dot-dash line 59.

The mechanical advantage provided by the scissors-type lever arms 40-47 driven in the manner described, results in movement of the actuator head 55 toward and away from a plane passing through shaft 36 normal to line 59 twice as fast as the concurrent movement of pivot pin 50 toward and away from such plane.

Actuator head 55 preferably is provided with an electromagnet 60 energized through power cable 61 connected to a suitable source of power. Preferably magnet 60 is mounted on pivot shaft 56 (FIG. 12) by a flexible floating mount indicated at 62 to permit the engaging face 63 of electromagnet 60 to accommodate to the orientation of a surface of any drawer 64 engaged and moved by actuator head 55.

A link 65 is pivotally connected between a pivot 66 mounted on and offset from shaft 50 and a pivot 67 mounted on magnet 60 offset from shaft 56. Link 65 acts as a stabilizer for maintaining the face 63 of magnet 60 in a plane generally perpendicular to the line of movement 59 of the actuator head 55 between retracted and extended positions.

Each pan 10 has a drawer 64 mounted by usual suspension means 68 on its pan 10 so that the drawer 64 may be moved between extended position shown in FIG. 4 and retracted position shown in FIG. 3.

Each drawer 64 in retracted position preferably is latched to its pan 10 by a latch mechanism generally indicated at 69 (FIG. 3). When magnet 60 of actuator head 55 is moved to engage latch mechanism 69, drawer 64 is unlatched and actuator head 55 during continued movement along line 59 moves drawer 64 to extended position of FIG. 4, indicated at 58 in FIG. 7. Meanwhile, magnet 60 has been energized so that upon reversing the direction of movement of actuator head 55, the ejector mechanism 20 retracts drawer 64 from extended position of FIG. 4 to retracted position of FIG. 3. At this time magnet 60 is de-energized and drawer 64 is again latched to pan 10 by latch mechanism 69.

Drive motor 22 if desired may rotate in one direction and thus rotate shaft 25, during each motor actuation, between retracted and extended positions of FIGS. 3 and 4. Alternatively, if motor 22 is a reversing motor, it may oscillate shaft 25 and connected crank 26 between the retracted and extended positions of FIGS. 3 and 4. Operation of motor 22 may be controlled by limit switches 70 and 71 (FIG. 11) incorporated in the control circuit for motor 22, limit switches 70 and 71 being actuated by the rounded cam end 72 of the crank 26. Limit switch 70 acts as the retracted position limit switch (FIG. 3) and limit switch 71 acts as the extended position limit switch (FIG. 4).

Drive chain 54 is provided with turnbuckle adjustments 73 and 74 in each flight so that the sprockets 37 and 52 may be properly oriented, one with respect to the other, to provide the proper retracted and extended positions 57 and 58 of the actuator head 55 and to provide for eliminating any backlash in the operation of the lever arms. The reversibility of washer 29 to change the effective crank arm length of crank 26 permits adjustment of the distance that a drawer 64 is moved outward of its pan 10.

The improved ejector mechanism thus provides positive straight-line movement of actuator head 55 in a direction perpendicular to a vertical plane (FIG. 3) passing through shaft 36 and located centrally between the vertical flights of conveyor travel. Further, the improved construction provides for locating the actuator mechanism, drive, etc. in the limited space extending generally laterally (FIG. 3) between the flights of conveyor travel while imparting positive straight-line stabilized movement of the actuator head 55 in a line perpendicular to the direction of conveyor travel. In addition, the improved construction provides for the positive adjustment of the length of stroke of the thrust head, and provides a floating mount for the head so that its engaging surfacing can accommodate warping or tilting of an engaged file drawer surface.

Finally, the improved ejector mechanism eliminates maintenance and adjustment problems heretofore encountered, and eliminates variable operating characteristics of the mechanism from file to file or as a result of repeated use. Accordingly, the improved construction eliminates difficulties encountered with prior devices, achieves the objectives indicated, and solves problems which have arisen in the art.

In the foregoing description, certain terms have been used for brevity, clearness and understanding; but no unnecessary limitations are to be implied therefrom because such terms are used for descriptive purposes and are intended to be broadly construed.

Moreover, the description and illustration of the invention is by way of example, and the invention is not limited to the exact structures shown because the parts, components and mechanisms may be varied in size and arrangement to provide other structural embodiments without departing from the fundamental concepts, aspects and principles of the invention.

Having now described the features, discoveries, and principles of the invention, the construction, assembly, characteristics, operation and use of a preferred form thereof, and the advantageous, new and useful results obtained thereby; the new and useful discoveries, principles, apparatus, combinations, parts, elements, subcombinations, structures, and cooperative relationships which characterize the invention are set forth in the appended claims.

I claim:

1. Power-operated ejector construction for moving the drawers of a power file of the type in which a plurality of pans are mounted on an endless conveyor mechanism carried by support means for movement in either direction in a continuous orbit of travel having at least one flight of travel in a plane extending parallel with the orbital axes and any selected pan is delivered by conveyor drive power means to a predetermined work station location, and in which a drawer is supported on each pan as a pan-drawer assembly on suspension mechanism which permits the drawer to be moved between ejected and retracted positions through a file access opening provided in the file case at said work station location; the construction including a support member mounted on the support means adjacent the work station and between flights of orbital conveyor travel, and drawer ejector mechanisms; the ejector mechanism including motor means mounted on the support member and having a drive shaft, and scissors-type lever arm means mounted on the support member; said lever arm means including a first shaft having a vertical axis, a first lever arm pivotally mounted at one end on said first shaft axis, the other end of the first arm having a second pivot axis, a second lever arm, means pivotally mounting one end of the second arm on said second pivot axis, the other free end of said second arm having a third pivot axis, an actuator head pivotally mounted on the third pivot axis at the free end of said second arm, and the effective lever arm length of said first and second lever arms between the pivot axes at the ends thereof being the same; drive means including a crank fixed to the motor drive shaft, a crank fixed to said first lever arm and a link pivotally connected to said cranks operatively connected between said motor drive shaft and said first arm for oscillating said first arm about the first axis between ejected and retracted positions, a first sprocket mounted on said first shaft axis, a second sprocket mounted on said second pivot axis, and operative connections between said arms and sprockets for rotating the second arm about the second pivot axis as the first arm is rotated about the first shaft axis for moving the actuator head between ejected and retracted positions; and said actuator head being moved in a straight line of travel perpendicular to a plane passing through the orbital axes as the actuator head moves between ejected and retracted positions.

2. The construction defined in claim 1 in which one of the pivotal connections between the cranks and link includes adjusting means for adjusting the length of stroke of the actuator head.

3. The costruction defined in claim 2 in which the adjusting means includes an elongated slot formed in one of the cranks, a washer having an opening and a pin spaced therefrom, the washer being adapted to be turned end for end with its pin projecting into one end of the slot and its opening aligned with the other end of the slot, and a crank pin pivotally connected with one end of the link and extending through the slot and opening.

4. The construction defined in claim 1 in which the first and second sprockets are differently sized and are chain connected to provide a mechanical advantage in driving the second sprocket.

5. The construction defined in claim 4 in which the first sprocket is fixed to the support member, in which the first shaft is rotatable with respect to the first sprocket, in which the first shaft is fixed to said first lever arm, in which the sprockets each have chain engageable teeth, and in which the first sprocket has twice as many teeth as the second sprocket.

6. The construction defined in claim 1 in which a stabilizing lever is pivotally connected at its ends to pivot pins mounted on the primary lever arm and actuator head offset respectively from said second and third pivot axes.

7. The construction defined in claim 1 in which the actuator head includes an electromagnet, in which a pivot shaft is journaled on the third pivot axis at the free end of the second lever arm, and in which flexible means supports said electromagnet on the third axis pivot shaft to permit the electromagnet to accommodate to a drawer surface engaged by said electromagnet.

References Cited

UNITED STATES PATENTS

| | | | |
|---|---|---|---|
| 3,297,378 | 1/1967 | Krug et al. | 312—223 |
| 3,298,766 | 1/1967 | Graber et al. | 312—223 |
| 3,306,691 | 2/1967 | Graber et al. | 312—223 |
| 3,356,433 | 12/1967 | Zippel | 312—223 |
| 3,480,343 | 11/1969 | Kanitz | 312—223 |

CASMIR A. NUNBERG, Primary Examiner

U.S. Cl. X.R.

312—766